(12) United States Patent
Chao et al.

(10) Patent No.: US 7,058,717 B2
(45) Date of Patent: Jun. 6, 2006

(54) METHOD AND SYSTEM FOR PROVIDING HIGHLY AVAILABLE SERVICES BASED ON A LOAD BALANCING POLICY AND A REUSABLE CONNECTION CONTEXT OBJECT

(75) Inventors: Ching-Yun Chao, Austin, TX (US); Chunlong Liang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 684 days.

(21) Appl. No.: 10/205,540

(22) Filed: Jul. 25, 2002

(65) Prior Publication Data

US 2004/0019680 A1 Jan. 29, 2004

(51) Int. Cl.
*G06F 15/173* (2006.01)
*G06F 9/46* (2006.01)
(52) U.S. Cl. ..................................... 709/226; 718/105
(58) Field of Classification Search ................ 709/226; 718/105
See application file for complete search history.

(56) References Cited

U.S. PATENT DOCUMENTS

| | | | |
|---|---|---|---|
| 5,170,480 A | | 12/1992 | Mohan et al. |
| 5,553,242 A | | 9/1996 | Russell et al. |
| 5,603,029 A | * | 2/1997 | Aman et al. ................. 718/105 |
| 5,664,010 A | * | 9/1997 | Walker et al. ......... 379/221.07 |
| 5,956,714 A | | 9/1999 | Condon |
| 6,105,067 A | | 8/2000 | Batra |
| 6,161,139 A | * | 12/2000 | Win et al. ..................... 709/225 |
| 6,173,306 B1 | * | 1/2001 | Raz et al. .................... 718/102 |
| 6,173,311 B1 | * | 1/2001 | Hassett et al. ............... 709/202 |
| 6,286,111 B1 | * | 9/2001 | Snover ............................ 714/4 |
| 6,356,930 B1 | | 3/2002 | Garg |
| 6,363,497 B1 | | 3/2002 | Chrabaszcz |
| 6,421,317 B1 | * | 7/2002 | Denecheau et al. .......... 370/222 |
| 6,574,229 B1 | * | 6/2003 | Takahashi et al. ........... 370/400 |
| 6,718,387 B1 | * | 4/2004 | Gupta et al. ................. 709/226 |
| 6,728,748 B1 | * | 4/2004 | Mangipudi et al. ......... 718/105 |
| 6,760,324 B1 | * | 7/2004 | Scott et al. .................. 370/352 |
| 2002/0040402 A1 | * | 4/2002 | Levy-Abegnoli et al. ... 709/229 |

OTHER PUBLICATIONS

Network Working Group (RFC-1739), G. Kessler, et. al., Dec. 1994, p. 1-46.☐☐☐☐.*
An adaptive load balancing scheme for web servers, Aweya, et. al., Intl Journal of Network Mgt, 2002, p. 1-39.*

(Continued)

*Primary Examiner*—Beatriz Prieto
(74) *Attorney, Agent, or Firm*—Stephen J. Walder, Jr.; David A. Mims, Jr.

(57) ABSTRACT

An example of a solution provided here comprises: providing a connection pool, said connection pool including a connection for each of a plurality of servers; applying a load-balancing policy to said connection pool; and assigning a connection from said connection pool to a client, according to said load-balancing policy. Another example of a solution comprises: providing a plurality of directory servers; providing a connection pool, said connection pool including a connection for each of said plurality of directory servers; applying a load-balancing policy to said connection pool; and assigning a connection from said connection pool to a client, according to said load-balancing policy. Methods for providing highly available services, systems for executing such methods, and instructions on a computer-usable medium, for executing such methods, are provided.

26 Claims, 4 Drawing Sheets

OTHER PUBLICATIONS

Performance and Tuning Guide, iPlanet Application Server, version 6.5, 816-2587-10, Feb. 2002, p. 1-94.*
Dynamic Load Balancing on Web-Server systems, Cardellini, et. al., IEEE Internet Computing, May-Jun. 1999, p. 28-39.*
End-to-End Transactions in Three-Tier Systemts, Zhang, D., et. al., Proceedings of the Third International Symposium on Distributed Objects and Applications table of contents, 2001, ISBN:0-7695-1300-X, p. 330-339.*
Evaluating architectures for multithreaded object request brokers. Schmidt, D., Comm of the ACM, vol. 41, Issue 10, ISSN: 001-0782, Oct. 1998, p. 54-60.*
Calcote, "Thread Pools and Server Performance," Dr. Dobb's Journal, Jul. 1997.
Hussain, "Understanding LDAP," Dr. Dobb's Journal, Mar. 1999.
Jannak, "Java 2 Graphics Rendering," Dr. Dobb' s Journal, Sep. 1999.
O'Malley, "Agents & Automated Online Trading," Dr. Dobb's Journal, May 2001.
"JNDI: Java Naming & Directory Interface," Sun Microsystems, Inc., available as "jndiexecsumm.pdf" (2002), available from http://java.sun.com/jndi.
"JNDI Overview," Sun Microsystems, Inc., available at http://java.sun.com/products/jndi/tutorial/getStarted/overview/index.html.
"Naming Package," Sun Microsystems, Inc., available at http://java.sun.com/products/jndi/tutorial/getStarted/overview/naming.html.
"Directory Package," Sun Microsystems, Inc., available at http://java.sun.com/products/jndi/tutorial/getStarted/overview/directory.html.
"Directory-Enables Java Applications," Sun Microsystems, Inc., available at http://java.sun.com/products/jndi/tutorial/getStarted/concepts/java.html.
"Naming Concepts," Sun Microsystems, Inc., available at http://java.sun.com/products/jndi/tutorial/getStarted/concepts/naming.html.
"Reading Attributes," Sun Microsystems, Inc., available at http://java.sun.com/products/jndi/tutorial/basics/directory/getattrs.html.
"Modifying Attributes," Sun Microsystems, Inc., available at http://java.sun.com/products/jndi/tutorial/basics/directory/modattrs.html.
"Required Software," Sun Microsystems, Inc., available at http://java.sun.com/products/jndi/tutorial/basics/prepare/software.html.
"Contexts," Sun Microsystems, Inc., available at http://java.sun.com/products/jndi/tutorial/ldap/faq/context.html.
SUNDSTED, "JNDI Overview, Part 1: An introduction to naming services," *Java World*, Jan. 2000-Mar. 2000, available at http://www.javaworld.com/javaworld/jw-01-2000/jw-01-howto_p.html.
SUNDSTED, "JNDI Overview, Part 2: An introduction to directory services," *Java World*, Jan. 2000-Mar. 2000, available at http://www.javaworld.com/javaworld/jw-02-2000/jw-02-howto_p.html.
SUNDSTED, "JNDI Overview, Part 3: Advanced JNDI," *Java World*, Jan. 2000-Mar. 2000, available at http://www.javaworld.com/javaworld/jw-03-2000/jw-03-howto_p.html.
SUNDSTED, "JNDI Overview, Part 4: the Doc-u-Matic, a JNDI application," *Java World*, Jan. 2000-Mar. 2000, available at http://www.javaworld.com/javaworld/jw-03-2000/jw-0331-howto_p.html.

* cited by examiner

METHOD AND SYSTEM FOR PROVIDING HIGHLY AVAILABLE SERVICES BASED ON A LOAD BALANCING POLICY AND A REUSABLE CONNECTION CONTEXT OBJECT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to information handling, and more particularly to methods and systems to provide highly available services.

BACKGROUND OF THE INVENTION

Various approaches have been proposed for improving the performance of client-server applications. Examples include U.S. Pat. No. 6,105,067 (Batra, *Connection Pool Management for Backend Servers Using Common Interface*, Aug. 15, 2000), U.S. Pat. No. 6,356,930 (Garg, *Connection Concentrator for Distributed Object Systems*, Mar. 12, 2002), and U.S. Pat. No. 5,553,242 (Russell, *Client/Server Connection Sharing*, Sep. 3, 1996). However, these patents addresses substantially different problems (such as limiting the number of connections to a client or server), and thus are significant different from the present invention. Other examples include an article by Kevin O'Malley, "Agents & Automated Online Trading: The TAC Game System Takes Care of Business," *Dr. Dobb's Journal*, May 2001, an article by Torpum Jannak, "Java 2 Graphics Rendering: an Architecture for Extreme Animation," *Dr. Dobb's Journal*, September 1999, and an article by John Calcote, "Thread Pools and Server Performance: Thread Pools Can Save CPU Cycles," *Dr. Dobb's Journal*, July 1997. However, none of the above-mentioned patents or articles involve redundant servers, and none offer high-availability solutions.

In considering the performance of client-server applications, reliability and availability are very important in some environments. Where reliability and availability are important, it is preferable to avoid dependence on a single component such as a server. That single server could be a single point of failure, a point where a malfunction would disable a larger system. Thus there is a need for systems and methods that provide client-server applications with highly available services, where single points of failure are avoided.

SUMMARY OF THE INVENTION

An example of a solution to problems mentioned above comprises: providing a connection pool, said connection pool including a connection for each of a plurality of servers; applying a load-balancing policy to said connection pool; and assigning a connection from said connection pool to a client, according to said load-balancing policy. Another example of a solution comprises: providing a plurality of directory servers; providing a connection pool, said connection pool including a connection for each of said plurality of directory servers; applying a load-balancing policy to said connection pool; and assigning a connection from said connection pool to a client, according to said load-balancing policy.

BRIEF DESCRIPTION OF THE DRAWINGS

A better understanding of the present invention can be obtained when the following detailed description is considered in conjunction with the following drawings. The use of the same reference symbols in different drawings indicates similar or identical items.

DETAILED DESCRIPTION

The examples that follow involve the use of one or more computers and may involve the use of one or more communications networks. The present invention is not limited as to the type of computer on which it runs, and not limited as to the type of network used. Some of the examples that follow have been implemented by using object-oriented programming with the JAVA programming language; however, the invention could be implemented with another programming language. Various operating systems could be used. Some of the examples that follow have been implemented for providing highly-available services to web application server software. More particularly, in an example implementation, a security function for a web application server used the JAVA Naming and Directory Interface (JNDI) to communicate with directory servers that utilized Lightweight Directory Access Protocol (LDAP). In this example, a security function for a web application server accessed directory servers to perform a search or authenticate a user. However, the invention could be used in various situations involving connections to servers, where highly available services may be desired.

The following are definitions of terms used in the description of the present invention and in the claims:

"Client-server application" means any application involving a client that utilizes a service, and a server that provides a service. Examples of such a service include but are not limited to: information services, transactional services, security functions, access to databases, and access to audio or video content.

"Component" means any element or part, and may include elements consisting of hardware or software or both.

"Computer-usable medium" means any carrier wave, signal or transmission facility for communication with computers, and any kind of computer memory, such as floppy disks, hard disks, Random Access Memory (RAM), Read Only Memory (ROM), CD-ROM, flash ROM, non-volatile ROM, and non-volatile memory.

"Connection" means whatever is needed to provide communication between a client and a server, such as a physical or wireless link, driver software, and necessary information such as a server's name or address, a name of a database, service provider, or directory, and security credentials.

"High availability" or "Highly available" refers to services or systems that are accessible, usable, or up most of the time, or that recover from failures quickly, perhaps involving redundant components.

"Storing" data or information, using a computer, means placing the data or information, for any length of time, in any kind of computer memory, such as floppy disks, hard disks, Random Access Memory (RAM), Read Only Memory (ROM), CD-ROM, flash ROM, non-volatile ROM, and non-volatile memory.

Figure 1:
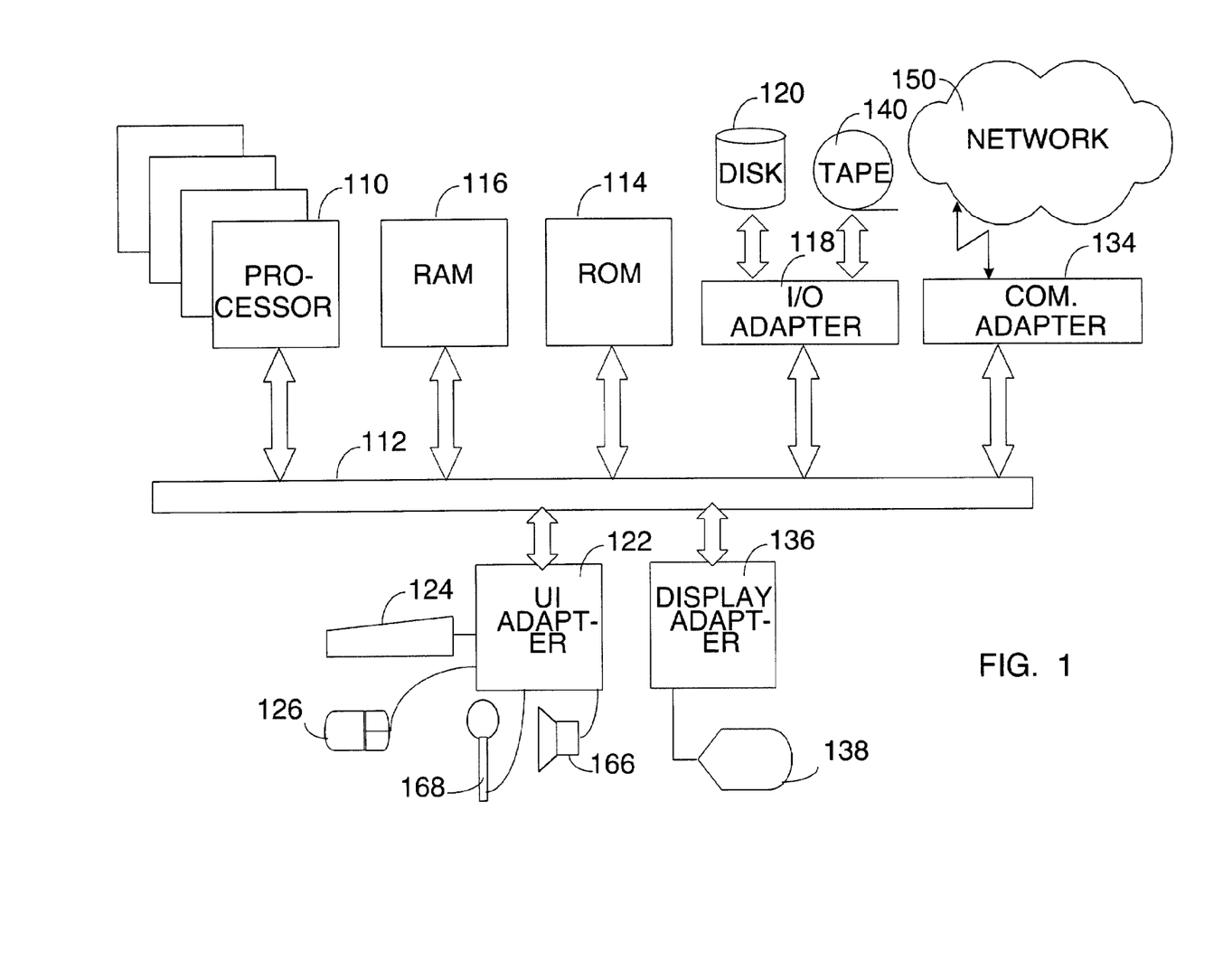
FIG. 1 illustrates a simplified example of a computer system capable of performing the present invention.

FIG. 1 illustrates a simplified example of an information handling system that may be used to practice the present invention. The invention may be implemented on a variety of hardware platforms, including embedded systems, personal computers, workstations, servers, and mainframes. The computer system of FIG. 1 has at least one processor 110. Processor 110 is interconnected via system bus 112 to random access memory (RAM) 116, read only memory (ROM) 114, and input/output (I/O) adapter 118 for connecting peripheral devices such as disk unit 120 and tape drive 140 to bus 112. The system has user interface adapter 122 for connecting keyboard 124, mouse 126, or other user interface devices such as audio output device 166 and audio input device 168 to bus 112. The system has communication adapter 134 for connecting the information handling system to a data processing network 150, and display adapter 136 for connecting bus 112 to display device 138. Communication adapter 134 may link the system depicted in FIG. 1 with hundreds or even thousands of similar systems, or other devices, such as remote printers, remote servers, or remote storage units. The system depicted in FIG. 1 may be linked to both local area networks (sometimes referred to as intranets) and wide area networks, such as the Internet.

While the computer system described in FIG. 1 is capable of executing the processes described herein, this computer system is simply one example of a computer system. Those skilled in the art will appreciate that many other computer system designs are capable of performing the processes described herein.

Figure 2:
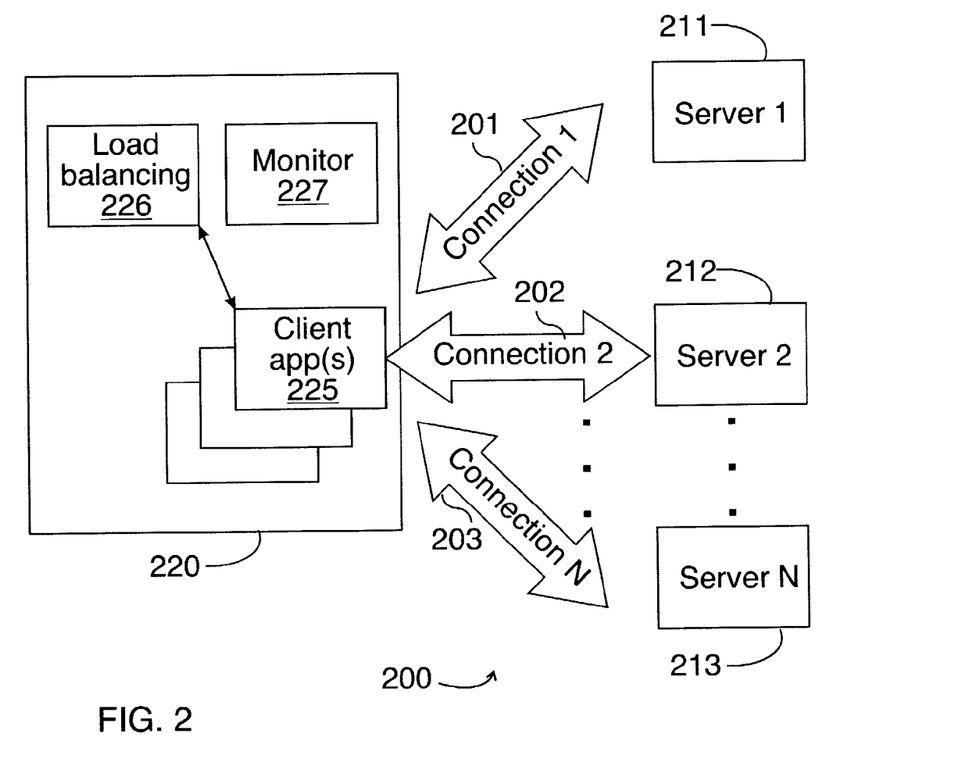
FIG. 2 is a high-level block diagram illustrating an example of a system and method for providing highly available services, according to the teachings of the present invention.

FIG. 2 is a high-level block diagram illustrating an example of a system and method for providing highly available services, according to the teachings of the present invention. To begin with an overview, this example comprises: providing a connection pool 200, said connection pool including a connection (connections numbered 1–N, shown at 201, 202, and 203) for each of a plurality of servers (servers numbered 1–N, shown at 211, 212, and 213); applying a load-balancing policy (at 226) to said connection pool 200; and assigning a connection from said connection pool 200 to a client 225, according to said load-balancing policy. There may be one or more client application(s) 225 that typically would initiate communication with a server (211, 212, or 213) and request a service of some kind. See FIG. 3 for more details on load balancing. Such an example may also include continuously managing the content of connection pool 200. Monitor 227 symbolizes a means for continuously managing the content of connection pool 200; see FIG. 4 for more details. Client application(s) 225, load-balancing service 226, and monitor 227 may be parts of a larger component 220.

Such an example may be extended to a user-registry example, with both "read" and "write" access at runtime. Consider a read-write example, with directory servers employing LDAP. LDAP servers could be categorized into two types. The primary type (e.g. 211 and 212) would provide both "read" and "write" access. The backup type (e.g. 213) would be typically used for "read" access. A "write" operation would be applied to all read-write LDAP servers (e.g. 211 and 212). An external mechanism would be used to keep the read-only type of LDAP servers (e.g. 213) consistent with those read-write LDAP servers (e.g. 211 and 212). A "read" request could be distributed to any of the read-write (e.g. 211 and 212) and read-only (e.g. 213) LDAP servers. In other words, this approach may be applied to handle "read" requests for best utilization and performance. A "write" request would be sent to one read-write LDAP server (e.g. 211) or distributed to all read-write LDAP servers (e.g. 211 and 212), depending on the external synchronization mechanism, to maintain consistency. Thus a read-write example may involve allowing a "read" operation on any of the servers (211, 212, and 213); and allowing a "write" operation on at least one of the servers (e.g. 211 and 212).

FIG. 2 may be used to describe some details of an example implementation. Application servers and many other software products perform user authentication against a user registry. User privilege attributes, as well as other profile information, may be stored in the user registry. A user registry may be implemented in various ways. Employing LDAP is one common way to implement a user registry, and LDAP was employed in this example. Turning to FIG. 2, the example implementation comprised: providing a plurality of directory servers (servers numbered 1–N, shown at 211, 212, and 213); providing a connection pool 200, said connection pool 200 including a connection for each of said plurality of directory servers; applying a load-balancing policy (at 226) to said connection pool 200; and assigning a connection from said connection pool 200 to a client 225, according to said load-balancing policy. Client application 225 got a connection (one of connections numbered 1–N, shown at 201, 202, and 203), assigned by a load-balancing service 226, to perform an operation. This example involved utilizing JNDI in providing connection pool 200. JNDI may provide access to a variety of services, such as access to security credentials, file systems, and databases. This example utilized LDAP directory servers (i.e. the plurality of directory servers shown at 211, 212, and 213 were directory servers employing LDAP). This example involved continuously managing the content of connection pool 200. Monitor 227 symbolizes a means for continuously managing the content of connection pool 200, such as a monitor thread; see FIG. 4 for more details.

Connection pool 200 can be implemented as a pool of objects. Reference is made to an article by Torpum Jannak, "Java 2 Graphics Rendering: an Architecture for Extreme Animation," *Dr. Dobb's Journal*, September 1999, that includes code for implementing an object pool, with reuse of the objects.

The example implementation involved utilizing a JNDI context in providing each connection (connections numbered 1–N, shown at 201, 202, and 203). The context contained information about one server (e.g. one of the servers numbered 1–N, shown at 211, 212, and 213), and contained one connection to one server. The context was reusable. A JNDI context object provides methods such as a "bind" method that binds a name to an object. The example implementation utilized the JNDI DirContext class, a subclass of the context class, that provides methods for directory services. Reference is made to the articles by Todd Sunsted, "JNDI Overview, Parts 1–4," *Java World*, January, February, and March 2000, that provide detailed information about using JNDI and LDAP. In particular, reference is made to Sunsted's "JNDI Overview, Part3: Advanced JNDI," *Java World*, March 2000 that includes code for connecting to an LDAP server. Also, reference is made to Sunsted's "JNDI Overview, Part 4: The Doc-u-matic, a JNDI Application," *Java World*, March 2000 that includes code for binding objects and looking up objects from a directory service.

The example implementation scaled very well, and worked well with various JNDI implementations. The example implementation provided a highly-available LDAP user registry, and it provided improved performance compared with a user registry with a single LDAP server.

LDAP is a popular protocol employed in the above-mentioned example. LDAP may be used to provide information stored in a directory (such as information about people, information about servers and services, and access controls). When this kind of information is required, the present invention may well be employed. Many implementations of LDAP are available, such as the software product sold under the trademark SECURE WAY DIRECTORY by IBM, the software product sold under the trademark LOTUS DOMINO SERVER, or open source software known as Open LDAP. The software product sold under the trademark ACTIVE DIRECTORY by MICROSOFT and the software product sold under the trademark NETSCAPE DIRECTORY SERVER are other implementations of LDAP. The product sold under the trademark NOVELL DIRECTORY SERVICE is compatible with LDAP.

Some alternative naming services to consider are: the Domain Name System (DNS), the Internet's naming service, and Common Object Services (COS) naming, that allows applications to store and access references to Common Object Request Broker Architecture (CORBA) objects.

Figure 3:
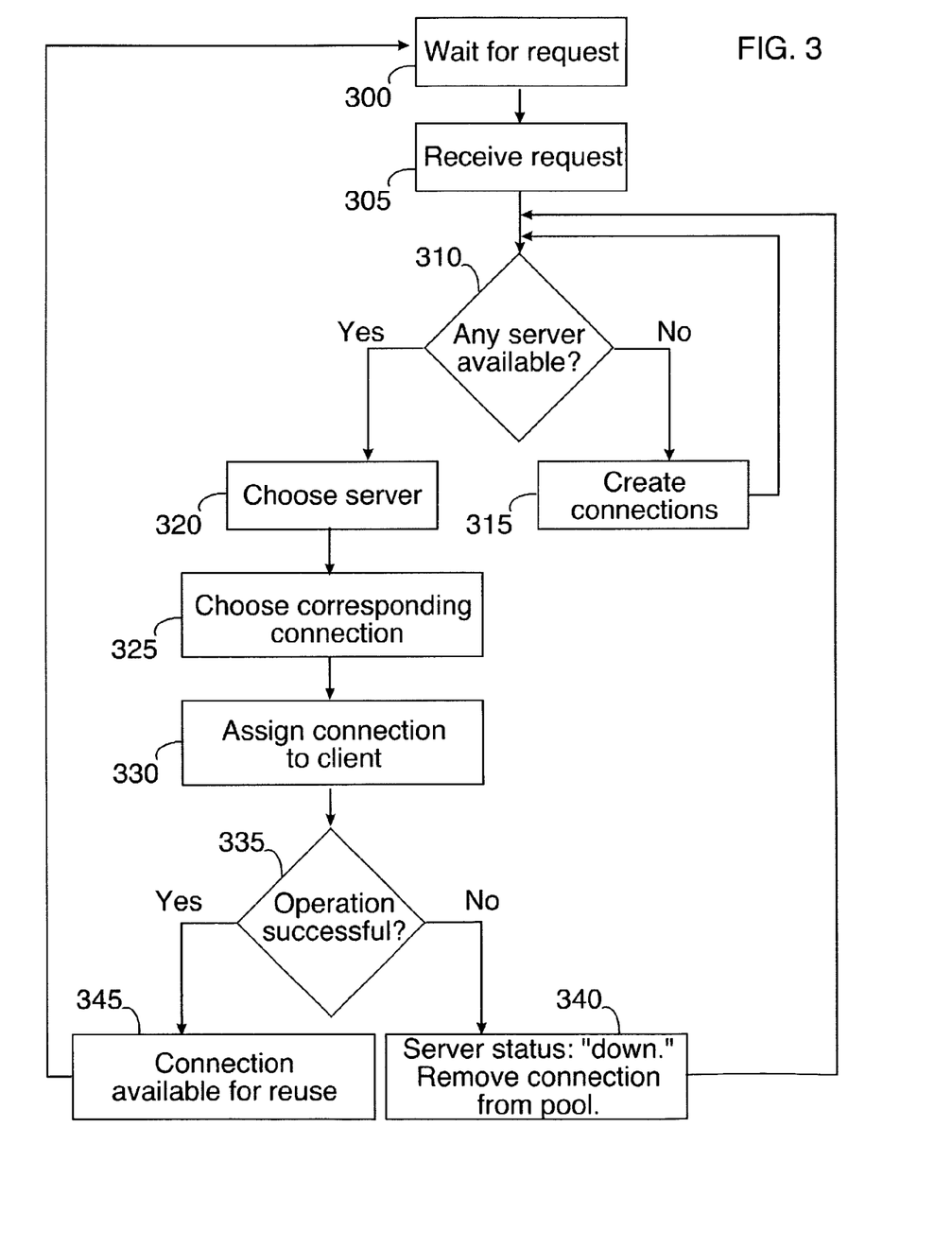
FIG. 3 is a flow chart illustrating an example of a load-balancing method.

FIG. 3 is a flow chart illustrating an example of a load-balancing method. To begin with an overview, this example involves receiving a client's request for a connection to a server (block 305), applying a load-balancing policy to a connection pool (blocks 320–325); and assigning a connection from said connection pool to a client (block 330), according to said load-balancing policy. This example also involves monitoring said connection pool for failures (decision 335), removing from said connection pool a connection to a failed server (block 340), and adding connections to said connection pool (block 315).

FIG. 3 may be used to describe some details of an example implementation, in which there was a pool of connections, one connection for each operational LDAP server. Connections were implemented with JNDI contexts. Load balancing was implemented above the JNDI interface. A client application got a DirContext from a load-balancing service to perform an operation. FIG. 3 begins with waiting for a request, block 300. JNDI lookup and binding requests ("receive requests," block 305) were distributed to operational LDAP servers. If no server was available, the "No" branch was taken at decision 310, and connections to operational servers would be created if possible, at block 315. Then the path loops back to the path above decision 310. On the other hand, if at least one server was available, the function of recovering connections to operational servers was left to a monitor thread (see FIG. 4). If at least one server was available, the "Yes" branch was taken at decision 310, and next a load-balancing policy was used to choose a server, at block 320, choose a corresponding connection, block 325, and assign the connection to the client, block 330. If a server's status was "Down," it would not be chosen.

Requests were distributed to operational LDAP servers, based on a configurable load-balancing policy (blocks 320, 325, and 330). The load-balancing policy could be round robin, weighted round-robin, or other kinds of policies. For example, the policy could distribute requests equally, or more weight could be placed on a faster server. A connection pool and a server list were implemented with hashtables. A hashtable is an object that is like a dictionary. It is a set of key/value pairs. For the connection pool hashtable, the key was an LDAP server's uniform resource locator (URL), and the value was the context. For the server list hashtable, the key was an LDAP server's URL, and the value was the server's status.

If an operation failed, the "No" branch was taken at decision 335. Then at block 340, that server's status was changed to "down," and that server's connection was removed from the connection pool. Then the path loops back to the path above decision 310. There would be three tries to get a connection to an operational server. On the other hand, if an operation was successful, the "Yes" branch was taken at decision 335. The connection was available for reuse (block 345). Then the path loops back to block 300. The example implementation reused the same context.

Figure 4:
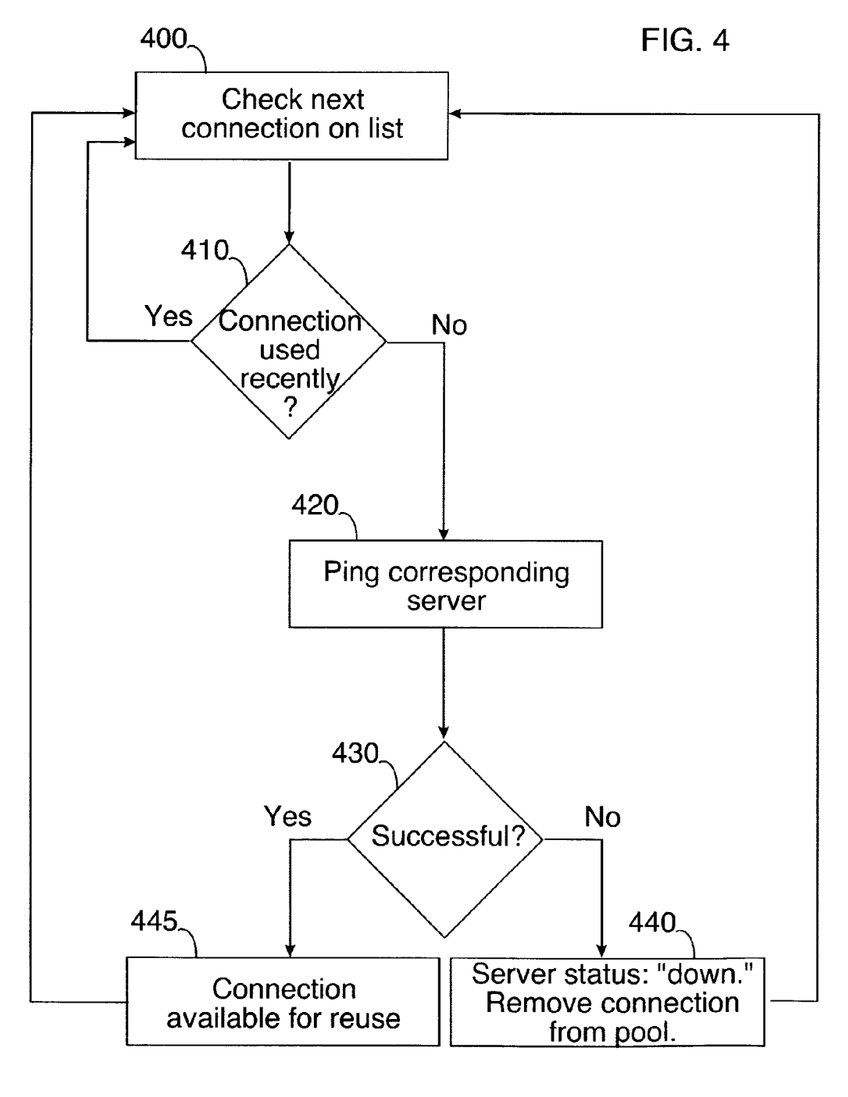
FIG. 4 is a flow chart illustrating an example of a monitoring method.

FIG. 4 is a flow chart illustrating an example of a monitoring method. This is a simplified example of continuously managing the content of a connection pool. To begin with an overview, managing the content may comprise one or more actions such as monitoring a connection pool for failures (block 420 and decision 430), removing from said connection pool a connection to a failed server (block 440), and adding a good connection to said connection pool, when a server becomes available (not shown in FIG. 4).

In an example implementation, a connection pool was managed by a monitor thread that periodically woke up, performed management functions (some of which are shown in FIG. 4), and then slept for a defined period. The monitor period was adjustable via a system-management graphical user interface. The monitor thread's cycle could be summarized as: (a) trying to connect to one or more servers that were previously down; (b) checking the availability of one or more servers that were previously up; (c) waiting for a defined interval; and (d) repeating (a)–(c) above. Before the first block in FIG. 4, the actions of waking up and trying to connect to one or more servers that were previously down could be performed. If a connection was made, that connection would be added to the pool. For each connection in the pool (beginning at block 400), if the connection was accessed recently (during the previous sleep period), the "Yes" branch was taken at decision 410. The monitor thread would not ping (check the availability of) the corresponding server if a connection was accessed recently. This avoided unnecessary pinging and avoided adding traffic to a busy system. Looping back to block 400, the monitor thread checked the next connection on the list. If on the other hand, the connection was not accessed during the previous sleep period, the "No" branch was taken at decision 410. Then the monitor thread would ping (check the availability of) the corresponding server (block 420). If the server or connection had failed, there was no response, and the "No" branch was taken at decision 430. At block 440, that server's status was changed to "down," and that server's connection was removed from said connection pool. Looping back to block 400, the monitor thread checked the next connection on the list. If on the other hand, there was a response to the ping, the "Yes" branch was taken at decision 430. The connection was available for reuse (block 445). Looping back to block 400, the monitor thread checked the next connection on the list.

Those skilled in the art will recognize that blocks in the above-mentioned flow charts could be arranged in a somewhat different order, but still describe the invention. Blocks could be added to the above-mentioned low charts to describe details, or optional features; some blocks could be subtracted to show a simplified example.

In conclusion, we have shown examples of methods and systems to provide highly available services.

One of the possible implementations of the invention is an application, namely a set of instructions (program code) executed by a processor of a computer from a computer-usable medium such as a memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer-usable medium having computer-executable instructions for use in a computer. In addition, although the various methods described are conveniently implemented in a general-purpose computer selectively activated or reconfigured by software, one of ordinary skill in the art would also recognize that such methods may be carried out in hardware, in firmware, or in more specialized apparatus constructed to perform the required method steps.

While the invention has been shown and described with reference to particular embodiments thereof, it will be understood by those skilled in the art that the foregoing and other changes in form and detail may be made therein without departing from the spirit and scope of the invention. The appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the appended claims may contain the introductory phrases "at least one" or "one or more" to introduce claim elements. However, the use of such phrases should not be construed to imply that the introduction of a claim element by indefinite articles such as "a" or "an" limits any particular claim containing such introduced claim element to inventions containing only one such element, even when the same claim includes the introductory phrases "at least one" or "one or more" and indefinite articles such as "a" or "an;" the same holds true for the use in the claims of definite articles.

We claim:

1. A method for providing highly available services, said method comprising:
   providing a connection pool, said connection pool including a connection for each of a plurality of servers, wherein the connection pool comprises a pool of reusable connection context objects, each reusable connection context object containing information about an associated server in the plurality of servers;
   applying a load-balancing policy to said connection pool;
   assigning a reusable connection context object from said connection pool to a client, according to said load-balancing policy, in response to a request from the client; and
   managing a content of the connection pool, wherein managing the content of the connection pool comprises periodically waking a connection pool management thread that, for each connection in the connection pool:
      determines if the connection in the connection pool was accessed during a previous sleep period of the connection pool management thread;
      checks availability of a server associated with the connection if the connection was not accessed during a previous sleep period of the connection pool management thread;
      maintains a reusable connection context object associated with the connection in the connection pool if the connection was accessed during the previous sleep period of the connection pool management thread or the check of the availability of the server results in an indication that the server is available; and
      removes the reusable connection context object associated with the connection from the connection pool if the check of the availability results in an indication that the server is not available.

2. The method of claim 1, wherein the connection pool management thread further:
   attempts to connect to at least one server of said plurality of servers that has a status indicating it was previously unavailable;
   determining if a connection to the at least one server of said plurality of servers that has a status indicating it was previously unavailable is successfully made; and
   adding a reusable connection context object to the connection pool for the at least one sewer if the connection is successfully made.

3. The method of claim 1, further comprising:
   detecting a failed operation;
   changing a status of a server that corresponds to the assigned reusable connection context object; and
   assigning another reusable connection context object from said connection pool to said client.

4. The method of claim 1, wherein said applying a load-balancing policy further comprises:
   allowing a "read" operation on any of said plurality of servers; and
   allowing a "write" operation on at least one of said plurality of servers, that is designated for "read" and "write" operations.

5. The method of claim 1, further comprising:
   determining if at least one server in the plurality of servers is currently available to handle a request from the client; and
   creating one or more reusable connection context objects in the connection pool for operational servers in the plurality of servers if no server is currently available to handle the request from the client.

6. The method of claim 1, wherein providing a connection pool further comprises:
   providing a connection pool hashtable, wherein a key for the connection pool hashtable is a uniform resource locator of the servers in the plurality of servers and a value for the connection pool hashtable is a context for the servers in the plurality of servers.

7. A method for providing highly available services, said method comprising:
   providing a plurality of directory servers;
   providing a connection pool, said connection pool including a connection for each of said plurality of directory servers, wherein the connection pool comprises a pool of reusable connection context objects, each reusable connection context object containing information about an associated directory server in the plurality of directory servers;

applying a load-balancing policy to said connection pool;

assigning a reusable connection context object from said connection pool to a client, according to said load-balancing policy, in response to a request from the client; and managing a content of the connection pool, wherein managing the content of the connection pool comprises periodically waking a connection pool management thread that, for each connection in the connection pool:

determines if the connection in the connection pool was accessed during a previous sleep period of the connection pool management thread;

checks availability of a server associated with the connection if the connection was not accessed during a previous sleep period of the connection pool management thread;

maintains a reusable connection context object associated with the connection in the connection pool if the connection was accessed during the previous sleep period of the connection pool management thread or the check of the availability of the server results in an indication that the server is available; and removes the reusable connection context object associated with the connection from the connection pool if the check of the availability results in an indication that the server is not available.

8. The method of claim 7, wherein the connection pool management thread further:

attempts to connect to at least one server of said plurality of servers that has a status indicating it was previously unavailable;

determining if a connection to the at least one server of said plurality of servers that has a status indicating it was previously unavailable is successfully made; and adding a reusable connection context object to the connection pool for the at least one server if the connection is successfully made.

9. The method of claim 7, further comprising:

detecting a failed operation;

changing a status of a server that corresponds to the assigned reusable connection context object; and assigning another reusable connection context object from said connection pool to said client.

10. The method of claim 7, wherein context information in the reusable connection context objects is JNDI context information.

11. The method of claim 7, wherein said plurality of directory servers includes a plurality of directory servers utilizing LDAP.

12. The method of claim 7, wherein:

said plurality of directory servers includes:

at least one directory server for "read" and "write" operations; and at least one directory server for "read" operations; and said applying a load-balancing policy further comprises:

allowing a "write" operation on said at least one directory server for "read" and "write" operations; and allowing a "read" operation on any of said plurality of directory servers.

13. The method of claim 7, further comprising:

determining if at least one server in the plurality of servers is currently available to handle a request from the client; and creating one or more reusable connection context objects in the connection pool for operational servers in the plurality of servers if no server is currently available to handle the request from the client.

14. The method of claim 7, wherein providing a connection pool further comprises:

providing a connection pool hashtable, wherein a key for the connection pool hashtable is a uniform resource locator of the servers in the plurality of servers and a value for the connection pool hashtable is a context for the servers in the plurality of servers.

15. A system for providing highly available services, said system comprising:

means for providing a connection pool, said connection pool including a connection for each of a plurality of servers, wherein the connection pool comprises a pool of reusable connection context objects, each reusable connection context object containing information about an associated directory server in the plurality of directory servers;

means for applying a load-balancing policy to said connection pool;

means for assigning a reusable connection context object from said connection pool to a client, according to said load-balancing policy, in response to a request from the client; and means for managing a content of the connection pool, wherein the means for managing the content of the connection pool comprises means for periodically waking a connection pool management thread that, for each connection in the connection pool:

determines if the connection in the connection pool was accessed during a previous sleep period of the connection pool management thread;

checks availability of a server associated with the connection if the connection was not accessed during a previous sleep period of the connection pool management thread;

maintains a reusable connection context object associated with the connection in the connection pool if the connection was accessed during the previous sleep period of the connection pool management thread or the check of the availability of the server results in an indication that the server is available: and removes the reusable connection context object associated with the connection from the connection pool if the check of the availability results in an indication that the server is not available.

16. The system of claim 15, wherein the connection pool management thread further;

attempts to connect to at least one server of said plurality of servers that has a status indicating it was previously down unavailable;

determining if a connection to the at least one server of said plurality of servers that has a status indicating it was previously unavailable is successfully made; and adding a reusable connection context object to the connection pool for the at least one server if the connection is successfully made.

17. The system of claim 15, further comprising:

means for detecting a failed operation;

means for changing a status of a server that corresponds to the assigned reusable connection context object; and means for assigning another reusable connection context object from said connection pool to said client.

18. The system of claim 15, wherein said means for applying a load-balancing policy further comprises:

means for allowing a "read" operation on any of said plurality of servers; and means for allowing a "write" operation on at least one of said plurality of servers, that is designated for "read" and "write" operations.

19. The system of claim 15, further comprising:

means for determining if at least one server in the plurality of servers is currently available to handle a request from the client; and means for creating one or more reusable connection context objects in the connection pool for operational servers in the plurality of servers if no server is currently available to handle the request from the client.

20. The system of claim 15, wherein the means for providing a connection pool further comprises:

means for providing a connection pool hashtable, wherein a key for the connection pool hashtable is a uniform resource locator of the servers in the plurality of servers and a value for the connection pool hashtable is a context for the servers in the plurality of servers.

21. A computer-usable medium having computer-executable instructions for providing highly available services, said computer-executable instructions comprising:

means for providing a connection pool, said connection pool including a connection for each of a plurality of servers, wherein the connection pool comprises a pool of reusable connection context objects, each reusable connection context object containing information about an associated directory server in the plurality of directory servers;

means for applying a load-balancing policy to said connection pool; and means for assigning a reusable connection context object from said connection pool to a client, according to said load-balancing policy, in response to a request from the client; and means for managing a content of the connection pool, wherein the means for managing the content of the connection pool comprises means for periodically waking a connection pool management thread that, for each connection in the connection pool:

determines if the connection in the connection pool was accessed during a previous sleep period of the connection pool management thread;

checks availability of a server associated with the connection if the connection was not accessed during a previous sleep period of the connection pool management thread;

maintains a reusable connection context object associated with the connection in the connection pool if the connection was accessed during the previous sleep period of the connection pool management thread or the check of the availability of the server results in an indication that the server is available; and removes the reusable connection context object associated with the connection from the connection pool if the check of the availability results in an indication that the server is not available.

22. The computer-usable medium of claim 21, wherein the connection pool management thread further:

attempts to connect to at least one server of said plurality of servers that has a status indicating it was previously unavailable;

determining if a connection to the at least one server of said plurality of servers that has a status indicating it was previously unavailable is successfully made; and adding a reusable connection context object to the connection pool for the at least one server if the connection is successfully made.

23. The computer-usable medium of claim 21, further comprising:

means for detecting a failed operation;

means for changing a stats of a server that corresponds to the assigned reusable connection context object; and means for assigning another reusable connection context object from said connection pool to said client.

24. The computer-usable medium of claim 21, wherein said means for applying a load-balancing policy further comprises:

means for allowing a "read" operation on any of said plurality of servers; and means for allowing a "write" operation on at least one of said plurality of servers, that is designated for "read" and "write" operations.

25. The computer usable medium of claim 21, wherein said computer-executable instructions further comprise:

means for determining if at least one server in the plurality of servers is currently available to handle a request from the client; and means for creating one or more reusable connection context objects in the connection pool for operational servers in the plurality of servers if no server is currently available to handle the request from the client.

26. The computer usable medium of claim 21, wherein the means for providing a connection pool further comprises:

means for providing a connection pool hashtable, wherein a key for the connection pool hashtable is a uniform resource locator of the servers in the plurality of servers and a value for the connection pool hashtable is a context for the servers in the plurality of servers.

* * * * *